United States Patent
Mitchell et al.

(10) Patent No.: US 9,384,229 B2
(45) Date of Patent: Jul. 5, 2016

(54) DATA READINESS USING INITIATOR REGION LAST COMMIT SELECTION

(71) Applicant: International Business Machines Corporation, Armonk, NY (US)

(72) Inventors: Ian J. Mitchell, Eastleigh (GB); Andrew Wright, Eastleigh (GB); Daniel W. Zachary, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

(21) Appl. No.: 13/688,781

(22) Filed: Nov. 29, 2012

(65) Prior Publication Data

US 2014/0149483 A1    May 29, 2014

(51) Int. Cl.
    *G06F 15/16*    (2006.01)
    *G06F 17/30*    (2006.01)
    *G06F 9/46*     (2006.01)

(52) U.S. Cl.
    CPC .......... *G06F 17/30348* (2013.01); *G06F 9/466* (2013.01); *G06F 17/30575* (2013.01)

(58) Field of Classification Search
    CPC ......... G06F 9/466; G06F 9/546; H04L 67/02; H04L 43/04; H04L 2029/06054; H04L 29/06; H04L 67/1002; H04L 67/1029
    See application file for complete search history.

(56) References Cited

U.S. PATENT DOCUMENTS

| | | | |
|---|---|---|---|
| 7,712,096 B2 | 5/2010 | Kaczynski et al. | |
| 8,140,623 B2 | 3/2012 | Fachan | |
| 8,185,493 B2 | 5/2012 | Matsumura | |
| 2003/0187884 A1* | 10/2003 | Holenstein et al. | 707/202 |
| 2005/0120059 A1* | 6/2005 | Verma et al. | 707/200 |
| 2007/0288555 A1* | 12/2007 | Felt et al. | 709/203 |
| 2009/0024851 A1* | 1/2009 | Andrade | 713/176 |
| 2009/0144750 A1 | 6/2009 | Little | |
| 2009/0217274 A1* | 8/2009 | Corbin et al. | 718/101 |
| 2011/0185360 A1 | 7/2011 | Mitchell et al. | |
| 2011/0246822 A1* | 10/2011 | Little | 714/16 |
| 2012/0124021 A1 | 5/2012 | Mitchell et al. | |

OTHER PUBLICATIONS

Author Unknown, Optimization Using Single Phase Commit and Promotable Single Phase Notification, Webpage/site, 2007, pp. 1-4, Microsoft Corporation, Published at: http://msdn.microsoft.com/en-us/library/ms229980%28v=vs.90%29.aspx.

Author Unknown, Prioritized Two Phase Commit Mechanism for Trigger and Replication Styles, Disclosure (Overview only), Jul. 12, 2010, p. 1, IP.com Prior Art Database, Published at: http://ip.com/IPCOM/000197434.

(Continued)

*Primary Examiner* — Djenane Bayard
(74) *Attorney, Agent, or Firm* — Lee Law, PLLC; Christopher B. Lee

(57) ABSTRACT

A portion of a transaction is received at a distributed transaction system from an initiator region. The distributed transaction system operates under a multi-tier two-phase commit protocol. A local unit of work is established that represents the portion of the transaction received from the initiator region. Processing of the local unit of work is invoked with at least one transaction participant. An indication is received from the initiator region to assume a role of transaction coordinator for the transaction. The initiator region is instructed to commit last relative to the at least one transaction participant of the local unit of work.

18 Claims, 5 Drawing Sheets

(56) References Cited

OTHER PUBLICATIONS

Djenane M. Bayard, Examiner, United States Patent and Trademark Office, Office Action for U.S. Appl. No. 14/057,608, Nov. 21, 2014, pp. 1-17, Alexandria, VA, USA.

Djenane M. Bayard, Examiner, United States Patent and Trademark Office, Office Action for U.S. Appl. No. 14/057,608, Jun. 17, 2015, pp. 1-16, Alexandria, VA, USA.

Djenane M. Bayard, Examiner, United States Patent and Trademark Office, Notice of Allowance for U.S. Appl. No. 14/057,608, Dec. 9, 2015, pp. 1-11, Alexandria, VA, USA.

* cited by examiner

DATA READINESS USING INITIATOR REGION LAST COMMIT SELECTION

BACKGROUND

The present invention relates to distributed two-phase commit (2PC) processing. More particularly, the present invention relates to data readiness using initiator region last commit selection.

Two-phase commit (2PC) is a protocol that provides atomic processing for a transaction processing paradigm across a distributed set of resources. Phase one of the 2PC protocol is a "prepare" phase during which a coordinator instructs participant resources to prepare their recoverable changes and confirm their readiness to either commit or backout the recoverable changes. Phase two of the 2PC protocol is a "commit" phase during which the coordinator instructs the participant resources to commit their recoverable changes, such as to storage.

BRIEF SUMMARY

A method includes receiving, at a distributed transaction system operating under a multi-tier two-phase commit protocol, a portion of a transaction from an initiator region; establishing a local unit of work that represents the portion of the transaction received from the initiator region; invoking processing of the local unit of work with at least one transaction participant; receiving an indication from the initiator region to assume a role of transaction coordinator for the transaction; and instructing the initiator region to commit last relative to the at least one transaction participant of the local unit of work.

A system includes a communication module and a processor configured to operate within a distributed transaction system operating under a multi-tier two-phase commit and programmed to: receive, via the communication module, a portion of a transaction from an initiator region; establish a local unit of work that represents the portion of the transaction received from the initiator region; invoke processing of the local unit of work with at least one transaction participant; receive an indication from the initiator region to assume a role of transaction coordinator for the transaction; and instruct the initiator region to commit last relative to the at least one transaction participant of the local unit of work.

A computer program product includes a computer readable storage medium having computer readable program code embodied therewith, where the computer readable program code when executed on a computer causes the computer to receive, at a distributed transaction system operating under a multi-tier two-phase commit protocol, a portion of a transaction from an initiator region; establish a local unit of work that represents the portion of the transaction received from the initiator region; invoke processing of the local unit of work with at least one transaction participant; receive an indication from the initiator region to assume a role of transaction coordinator for the transaction; and instruct the initiator region to commit last relative to the at least one transaction participant of the local unit of work.

DETAILED DESCRIPTION

Figure 1:
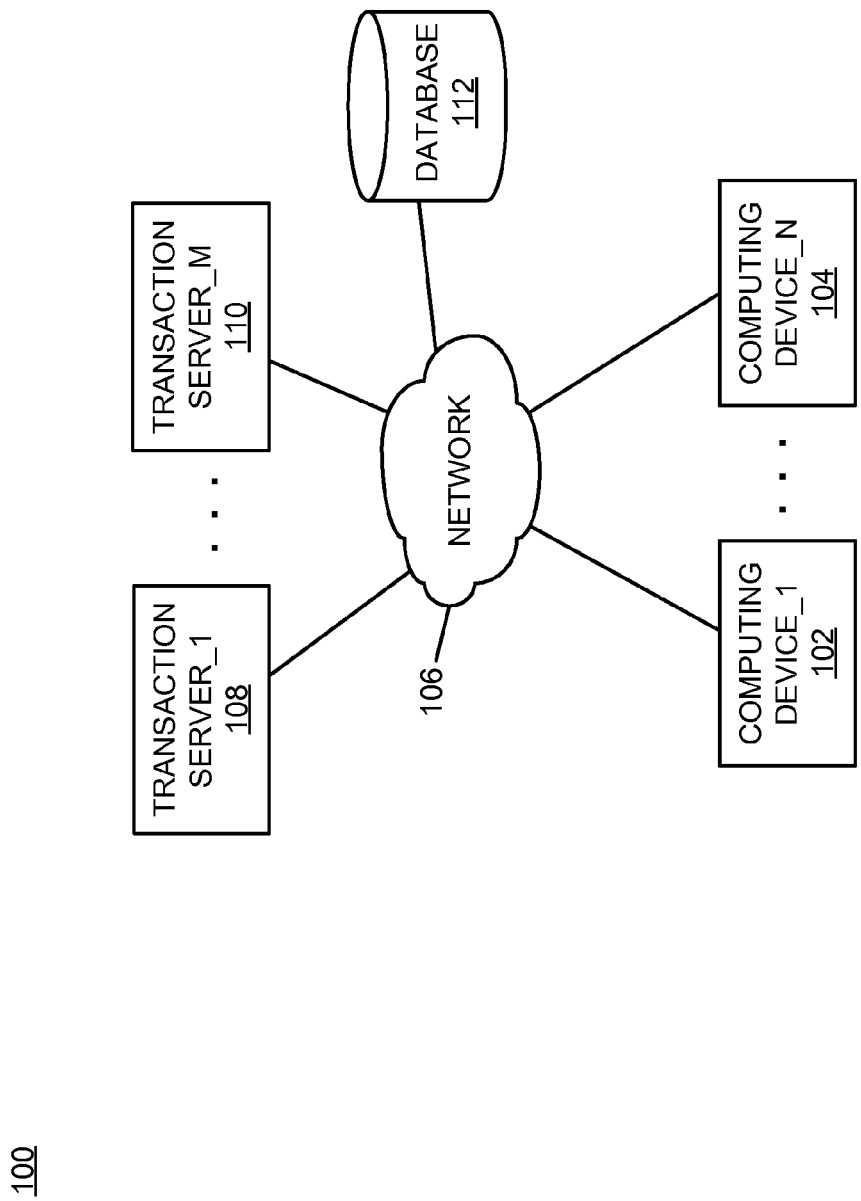
FIG. 1 is a block diagram of an example of an implementation of a system for data readiness using initiator region last commit selection according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides data readiness using initiator region last commit selection. The present technology relates to a modification to logic within the selection and execution of phase two (commit) calls to the various participant units of work being made from a coordinating unit of work within a distributed transaction environment. When iterating through the various items of state that represent obligations to call remote participant units of work to commit their parts of a distributed unit of work (UOW), the present technology determines whether the participant unit of work was the initiator of a syncpoint. If the participant unit of work was the initiator of the syncpoint, the call to the initiator of the syncpoint for commit processing is deferred until after the other units of work have been called to commit their portions of the distributed transaction. This processing ensures that all "call and return" type invocations (such as those to resource managers of databases, etc.) have completed by this stage in the syncpoint prior to invoking the initiator to commit. As such, data readiness for one or more initiator regions may be improved using the deferred commit call to the initiator region as described herein. Accordingly, a unit of work may be distributed across multiple systems (e.g., daisy chained) rather than managed within one single system to maintain many benefits of workload balancing and distributed workload processing, while avoiding additional "dummy call" work to verify data is ready for access by client applications and to avoid additional performance overhead that would result from such additional data verification processing and extra network traffic activity.

For purposes of the present description, it should be understood that the term "region" as used herein refers to a domain of processing within a distributed network of devices/servers that may be utilized for processing a distributed transaction under a multi-tier two-phase commit protocol. As such, the term "region" may refer to one or more computing devices, servers, or server systems within or controlled from within a domain that participate in a distributed transaction. Because the concept of regions assists with description of certain aspects of the present technology, such as progressive distribution of portions of a local unit of work defined in any given domain, distinctions between single or multiple devices within a given region are omitted for ease of description purposes. However, it is understood that the term "region" may have the terms "computing device," "server," or "system" substituted with equivalent meaning. Additionally, a "front-end region" represents a computing device, server, or system within a given domain that forwards a portion of its local unit of work for processing by a device within another domain. The receiving device may be referred to as an "intermediate region" or a "back-end region." A front-end region device of a distributed transaction system may be considered to be located within an "initiator region" relative to any other device within any other region that receives a portion of a distributed transaction.

By architecting the order in which participant units of work are called to commit to ensure the initiator unit of work is called back last, problems as described below that result from syncpoints being atomic but not synchronous may be avoided. The present technology recognizes the unique nature of the initiator of a syncpoint in a distributed transaction even where the initiator gives away the coordinator role. For example, the initiator, as a thread of application control is likely to (indeed, almost certainly bound to) continue when informed of the outcome. Under such circumstances, the present technology improves data readiness for client applications under conditions of distributed transactions. As such, the present technology improves data readiness for implementations of multi-tiered/distributed two-phase commit protocol architectures.

The present technology applies to distributed transaction processing systems. Using the technology described herein within a distributed transaction processing paradigm, transaction servers (e.g., customer information control system (CICS®) transaction servers) may exploit a two-phase commit protocol (alternatively "2PC" herein) to provide an ability to prepare and commit changes to a disparate/distributed set of remote resource managers. The distributed set of remote resource managers may include systems, such as other transaction regions connected via multi-region operation (MRO), intersystem communication (ISC), or via Internet protocol (IP). The distributed set of remote resource managers may also include distributed database managers, such as information management software (IMS) or database 2 (DB2). As described in more detail below, the present technology may be implemented to improve data readiness by providing data readiness using initiator region last commit selection.

Certain terminology used herein is briefly described below prior to expanded details of the present technology. A "distributed unit of work" is made up of a set of local units of work (UOW). A two-phase commit protocol (alternatively "2PC" herein) is a protocol used to ensure that distributed resources all agree on the outcome and execute based upon that agreement.

A "syncpoint" is a wrapper process within which the CICS® recovery manager domain follows the 2PC protocol to ensure there is a distributed consensual agreement on whether to go forward (commit) or go backward (backout, or commit backwards) with the set of changes made by the unit of work (UOW) that is syncpointing. A transaction management system may coordinate the preparation and commitment of recoverable state changes by use of a syncpoint. An "initiator" is a system that is performing a unit of work (e.g., transaction manager) that initiates a syncpoint. A "coordinator" is a system that is performing a unit of work (e.g., a system) that is controlling the syncpoint at a given point in time within the syncpoint processing. This role of coordinator may be passed from a system performing a local unit of work in one region to a system performing a local unit of work belonging to the same distributed unit of work in another region.

A "participant" is a system that is performing a unit of work in one of the other regions with an involvement in the syncpoint (e.g., a part of the same distributed UOW). Again, a system that is performing a portion of a unit of work may change roles as part of syncpoint processing, for example in this case giving away the coordinator role and becoming a participant.

An "indoubt" window/state represents a period of time between when a participant has prepared its own recoverable state and voted yes to commit the transaction, and a time when the participant is instructed to perform the commit (or perform a backout operation if some failure or no vote was received at some point within the subsequent distributed prepare processing). Units of work are considered to be indoubt during this time.

A "last agent optimization" is when the coordinator tells all but one (e.g., "n−1") of its participants to prepare themselves, and, assuming they can all prepare themselves and each votes yes to a commit, the participant then tells the final (e.g., "nth") unit of work to commit (rather than issuing a prepare instruction). As such, the last agent optimization avoids an extra network flow to tell this unit of work to prepare separately followed by an additional commit instruction. By using the last agent optimization, the coordinator has passed the coordination role to this final unit of work in the other system and itself now becomes an indoubt participant in the syncpoint. The final unit of work in the other system (now the coordinator of the syncpoint, alternatively referred to as the "last agent" coordinator) will either be able to commit or not. If the final unit of work (e.g., the last agent coordinator) can commit, it tells the old coordinator (now the participant) that it has committed. This notification then passes the coordination role back to this unit of work that had been indoubt while it awaited the response (as a result of using the last agent optimization). The original coordinator may now commit its own recoverable state changes, then tell its own remaining (e.g., again "n−1") participant units of work (that are all indoubt with respect to the original coordinator until this time) to commit. Similarly, if the last agent coordinator unit of work is unable to commit, and, instead, backs out its changes, then this response is passed back along with the coordination role to the original coordinator system that had been indoubt while it awaited the response. The original coordinator may now back out its own recoverable state changes, and tell its own remaining (e.g., again "n−1") participant units of work to back out their own changes (again, they are all indoubt until this time).

A refinement of the last agent optimization may be referred to as a "single updater." The single updater applies when no recoverable changes have been made by the coordinator unit of work, or by any of the remaining (e.g., again "n−1") connected units of work, such that no local logging of state changes is required for these units of work. In this situation, these systems are not affected by which way the nth participant unit of work chooses to act (e.g., commit or backout) as they have no recoverable work to commit or backout.

An "implicit forget" is when a participant unit of work is told to commit, but the coordinator unit of work does not wait for a committed response to be sent back explicitly from the participant unit of work. The coordinator does not demand that a flow be dedicated to just confirming that the participant processed the commit message, but will be satisfied to hear the commit acknowledgement piggy-backed on any subsequent message from the system with which the participant unit of work is associated. In this circumstance, the coordinator will retain knowledge that there is an outstanding response required from this participant's region. However, this response may be received when the connection between the systems gets reused at a later date/time. This reuse of the connection acts as the implicit signal to now "forget" the fact the commit response had been outstanding, thereby being an implicit operation.

With the above-described terminology, the present technology may be described in detail. Prior to description of the present technology, conception of the present technology will be briefly described using the terminology described above.

It should be noted that conception of the present subject matter resulted from recognition of certain limitations associated with distributed two-phase commit processing. For example, it was observed that certain processing, such as last agent transaction and implicit forget processing, may be associated with advanced two-phase commit transaction management. However, it was further observed that under certain circumstances associated with last agent transaction and implicit forget processing within a distributed transaction environment, a data unavailability may occur such that data is not ready for reading/access by a client application that issued a unit of work to be committed by a prior transaction when control returns to the client program. Specifically, it was observed that a client program (e.g., executing on a workstation) may direct work into a front-end system of a distributed transaction environment and may execute a program there, and that the front-end system may in turn invoke a back-end system for distributed processing of a transaction. The front- and back-end systems may be implemented, for example, using a system such as a customer information control system (CICS®). Specific observations that led to conception of the present subject matter are described below within the following several paragraphs.

For purposes of clarity with respect to the example below, it should be noted that it was determined that under circumstances where a distributed transaction involves at least one component that implements a "call and return" model of processing in a distributed/remote (non-initiator) region, but where last agent optimization is used by the first/initiator region and implicit forget is used by a distributed/remote syncpoint to return control to the initiator region prior to completion of the processing by the distributed component, a data unavailability (e.g., access error) in the initiator region may occur. For example, a lock may still be held on some new record or an updated record when the thread that created the update has been led to believe the transaction has been completed. As such, the timing of the subsequent request may result in an error when a client application attempts to access data written as part of a prior distributed transaction for which the client application is unaware that the data commit processing by the distributed component is not yet completed. It was determined that a reason for the data unavailability is a lack of a prescriptive ordering with respect to the sequence in which the participant systems are invoked by the coordinator for prepare or commit processing. Accordingly, the present subject matter improves distributed two-phase commit processing by providing for data readiness using initiator region last commit selection, as described above and in more detail below.

Regarding description of the specific observations that led to conception of the present subject matter, the front-end system is referred to herein as "Transaction Server Region_A." The first Transaction Server Region_A may establish a unit of work (UOW) under which to run the work for this program's thread of execution. Part of this work may involve calling a back-end region (a second Transaction Server Region_B) that manages a remote distributed database. The second Transaction Server Region_B may establish a UOW under which to run its own part of the distributed UOW for this thread of execution. The second Transaction Server Region_B may perform some work on another system (e.g., a database management system, such as DB2). Data is written to the database management system from the second Transaction Server Region_B. The database management system has its own view of the distributed UOW.

Eventually the program in the first Transaction Server Region_A may issue a syncpoint to commit the changes to all systems operating in the distributed transaction. The unit of work in the first Transaction Server Region_A is therefore referred to as the "initiator" and the coordinator of the syncpoint. To exploit the last agent optimization, the first Transaction Server Region_A instructs the second Transaction Server Region_B to commit. Under such a circumstance, the second Transaction Server Region_B is now the coordinator of the syncpoint, and the first Transaction Server Region_A is now a participant that is "indoubt" with respect to transaction processing by the second Transaction Server Region_B. The second Transaction Server Region_B may instruct the database management system to prepare. This work is moved to a separate thread of execution (e.g., a z/OS transaction control block (TCB)) under which the database management system work is performed. The second Transaction Server Region_B has to wait for the response from database management system to know how to proceed (the interface to resource owners may be a "call and return" model). The database management system may complete its work and indicate that it is ready to commit the transaction. However, the data that was added to the database is still uncommitted, and hence invisible to work beyond the distributed UOW, as per the isolation tenet of the atomicity, consistency, isolation, and durability (ACID) programming model for two-phase commit.

The second Transaction Server Region_B knows the database management system is able to commit, so it locally commits its own changes. The second Transaction Server Region_B then, as coordinator of the syncpoint, tells the first Transaction Server Region_A to commit. Committing is now honor bound to complete (the database management system voted yes when told to prepare, and the second Transaction Server Region_B has committed itself already). So, the second Transaction Server Region_B may rely upon an "implicit forget" flow from the first Transaction Server Region_A at some later time. The second Transaction Server Region_B may then tell the database management system to commit. This work may also be moved to a separate thread of execution (e.g., a z/OS TCB) under which to perform its portion of the distributed work. The database management system may begin the job of committing the changes, and the coordinator for the UOW in the second Transaction Server Region_B waits for this to complete (again, under the "call and return" model).

It was observed that during this time/delay, the first Transaction Server Region_A may receive the committed response from the second Transaction Server Region_B, so the first Transaction Server Region_A is no longer "indoubt" with respect to the processing of the second Transaction Server Region_B. The first Transaction Server Region_A commits itself, and the syncpoint completes as far as the program running within the first Transaction Server Region_A is concerned. However, it was observed that the database management system (operating as part of the second Transaction Server Region_B) may not have yet completed its portion of the work to commit the data to the respective database. It was determined that under this situation, the flow of control may be returned to the client program on the workstation prior to completion of the data commit portion of the transaction by the database management system. It was further determined that the client program may now issue a call to read the data that had been written in the previous UOW. However, it was further observed that when the first Transaction Server Region_A is called by the client program to perform this read operation, it calls second Transaction Server Region_B, which in turn calls the database management system to read the written table row back. As a result of the observations and determinations described above, it was additionally determined that under these circumstances, the database management system may return a "row not found" (or equivalent) error message since the data being read is still uncommitted and hence isolated from other UOWs (again under the ACID property requirement), which results in a data unavailability.

As such, it was determined that, although the syncpoint is atomic and the decision to commit is true for all of the respective distributed resource managers, the implementation is serial. It was further determined that because the syncpoints are serial, syncpoints may therefore be atomic, but not synchronous (e.g., not instantaneous), when dealing with distributed UOWs such as that described above. In view of the observations and determinations above, it was further determined that an ability for the coordinating unit of work to instruct the "initiator" unit of work to commit last may resolve this form of data unavailability. Such an advanced form of processing may be used to ensure that the other (e.g., n−1) distributed units of work in a given syncpoint would already have been told to commit prior to this point. In the case of a database management system that supports the "call and return" form of processing and not implicit forget, this may further ensure that the database management system would have responded to the coordinator of the syncpoint with a committed response prior to returning control to the distributed initiator region (e.g., under implicit forget commit), and thereby prior to the initiator region returning control to the client application. This in turn would mean the database table data would be committed, and hence visible to new requests made by the client program from the point in time that control is returned to the initiator region. Accordingly, the present subject matter improves distributed two-phase commit processing by providing for data readiness using initiator region last commit selection, as described above and in more detail below.

The data readiness using initiator region last commit selection described herein may be performed in real time to allow prompt distributed transaction processing. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for data readiness using initiator region last commit selection. The system 100 represents a distributed transaction environment/system. A computing device_1 102 through a computing device_N 104 communicate via a network 106 with several other devices. The other devices include a transaction server_1 108 through a transaction server_M 110. For purposes of the present description, the transaction server_1 108 through the transaction server_M 110 may represent transaction managers and/or resource managers, as appropriate for a given implementation.

One or more of the computing device_1 102 through the computing device_N 104 may execute a client program that may direct work into one of the transaction server_1 108 through the transaction server_M 110 that operates as a front-end system for the client program within the distributed transaction environment of the system 100. The respective transaction server 108 through 110 associated with the client program may initiate (e.g., invoke) distributed transactions that propagate to one or more of the other transaction servers within the system 100. Such a device may be considered an "initiator" region for purposes of the present examples. The present technology operates to select the initiator region to commit last to improve data readiness within the initiator region (and further upstream for multiple distributed transactions, such as daisy-chained transactions).

The respective transaction server(s) to which the work is initiated/propagated operates as a back-end system for distributed processing of a transaction. As described above, the respective transaction server that receives the invocation of the portion of the distributed transaction from another transaction server may assume the coordinator role of the syncpoint represented by the distributed portion of the transaction.

A database 112 may be accessed/managed by one or more of the transaction server_1 108 through the transaction server_M 110 as part of a distributed transaction. Within such an implementation, the respective transaction server 108 through 110 that accesses/manages the database 112 may be considered a database management system, as described above.

As will be described in more detail below in association with FIG. 2 through FIG. 5, the transaction server_1 108 through the transaction server_M 110 may each provide automated data readiness using initiator region last commit selection. The automated data readiness using initiator region last commit selection is based upon selection of the initiator of a respective syncpoint (from which the distributed portion of the transaction is invoked) as the last commit call made by a given transaction server (to which the distributed portion of the transaction is invoked). It should be understood that a distributed transaction may involve two or more resource managers, such as the transaction server_1 108 through the transaction server_M 110. As such, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
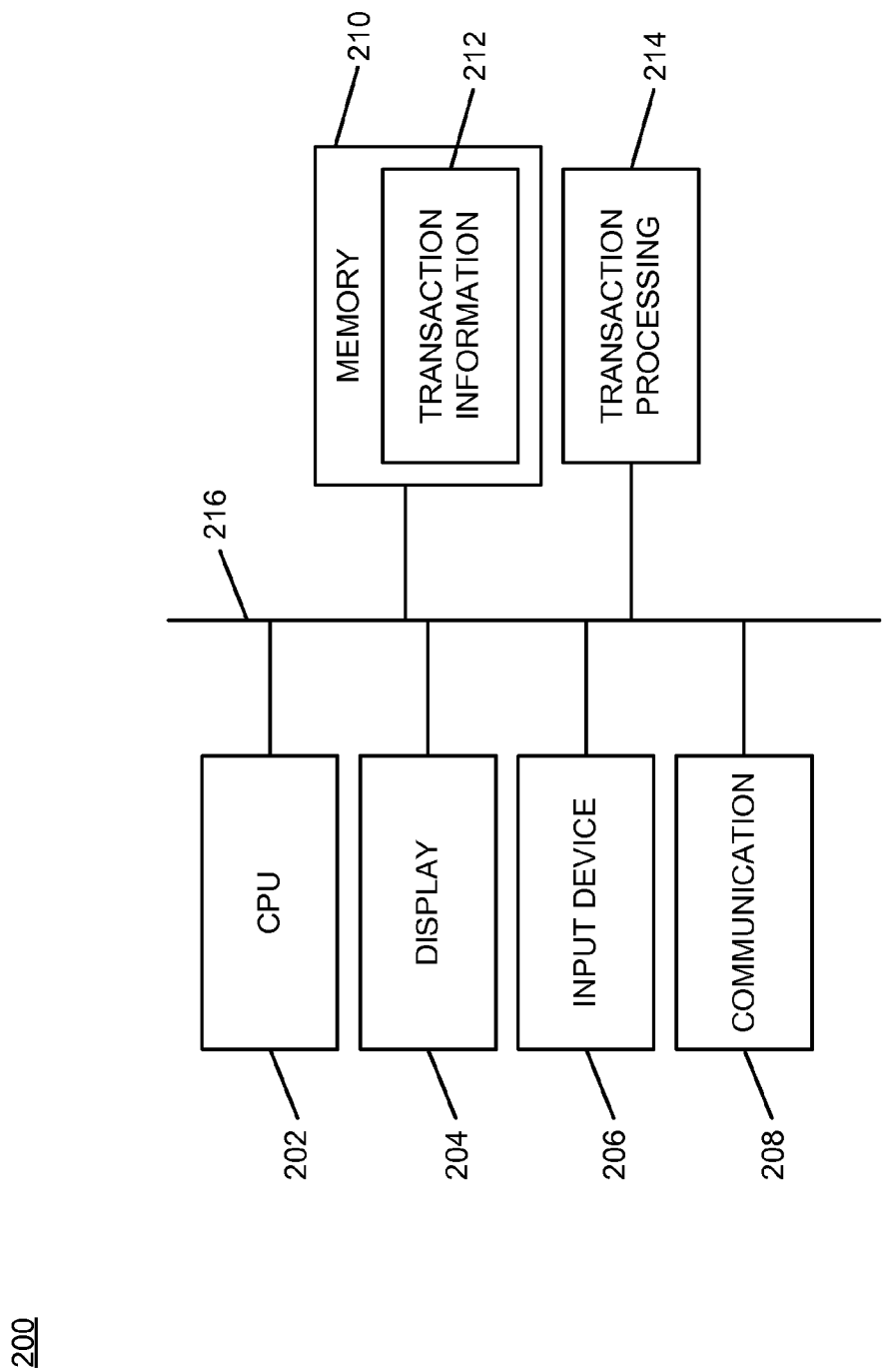
FIG. 2 is a block diagram of an example of an implementation of a core processing module capable of performing data readiness using initiator region last commit selection according to an embodiment of the present subject matter.

FIG. 2 is a block diagram of an example of an implementation of a core processing module 200 capable of performing data readiness using initiator region last commit selection. The general components of the core processing module 200 may be associated with either the computing device_1 102 through the computing device_N 104 or with the transaction server_1 108 through the transaction server_M 110, as appropriate for a given implementation, though it is noted that the transaction processing as described within the present examples is performed by the transaction server_1 108 through the transaction server_M 110. As such, the core processing module 200 is described generally herein, though it is understood that many variations on implementation of the components within the core processing module 200 are possible and all such variations are within the scope of the present subject matter.

Further, the core processing module 200 may provide different and complementary processing of portions of a distributed transaction in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a transaction information storage area 212 that stores information associated with a distributed/invoked or a received/propagated distributed transaction managed by the core processing module 200. As will be described in more detail below, the transaction information stored within the transaction information storage area 212 is used to process syncpoints to ensure that the initiator region is called last to commit.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A transaction processing module 214 is also illustrated. The transaction processing module 214 provides transaction processing capabilities for the core processing module 200, as described above and in more detail below in association with implementation for one or more of the transaction server_1 108 through the transaction server_M 110. However, it should be noted that transaction processing may also be implemented using one or more of the computing device_1 102 through the computing device_N 104. As described above, for a distributed transaction, the transaction processing module 214 calls the initiator region last to commit a portion of a transaction represented by a syncpoint. As such, the transaction processing module 214 implements the data readiness using initiator region last commit selection of the core processing module 200.

It should also be noted that the transaction processing module 214 may form a portion of other circuitry described without departure from the scope of the present subject matter. Further, the transaction processing module 214 may alternatively be implemented as an application stored within the memory 210. In such an implementation, the transaction processing module 214 may include instructions executed by the CPU 202 for performing the functionality described herein. The CPU 202 may execute these instructions to provide the processing capabilities described above and in more detail below for the core processing module 200. The transaction processing module 214 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the transaction processing module 214 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
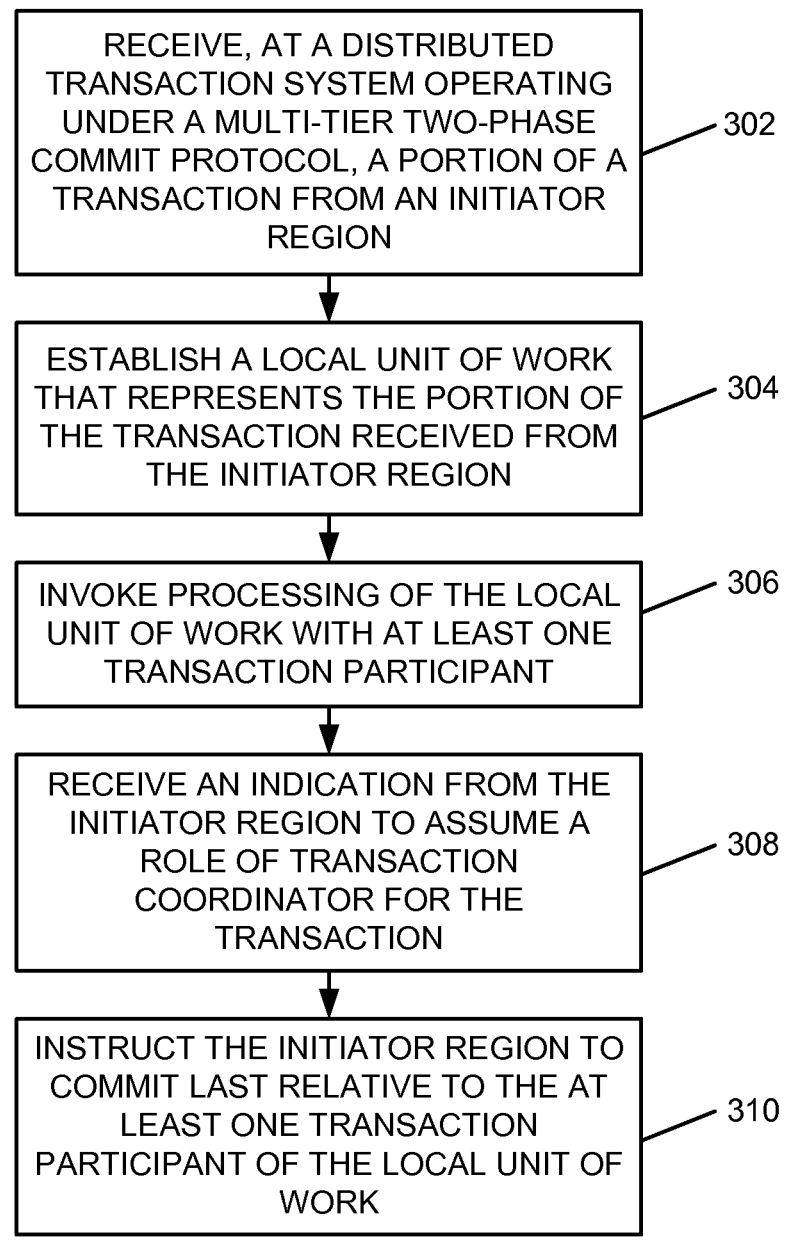
FIG. 3 is a flow chart of an example of an implementation of a process for data readiness using initiator region last commit selection according to an embodiment of the present subject matter.
Figure 4:
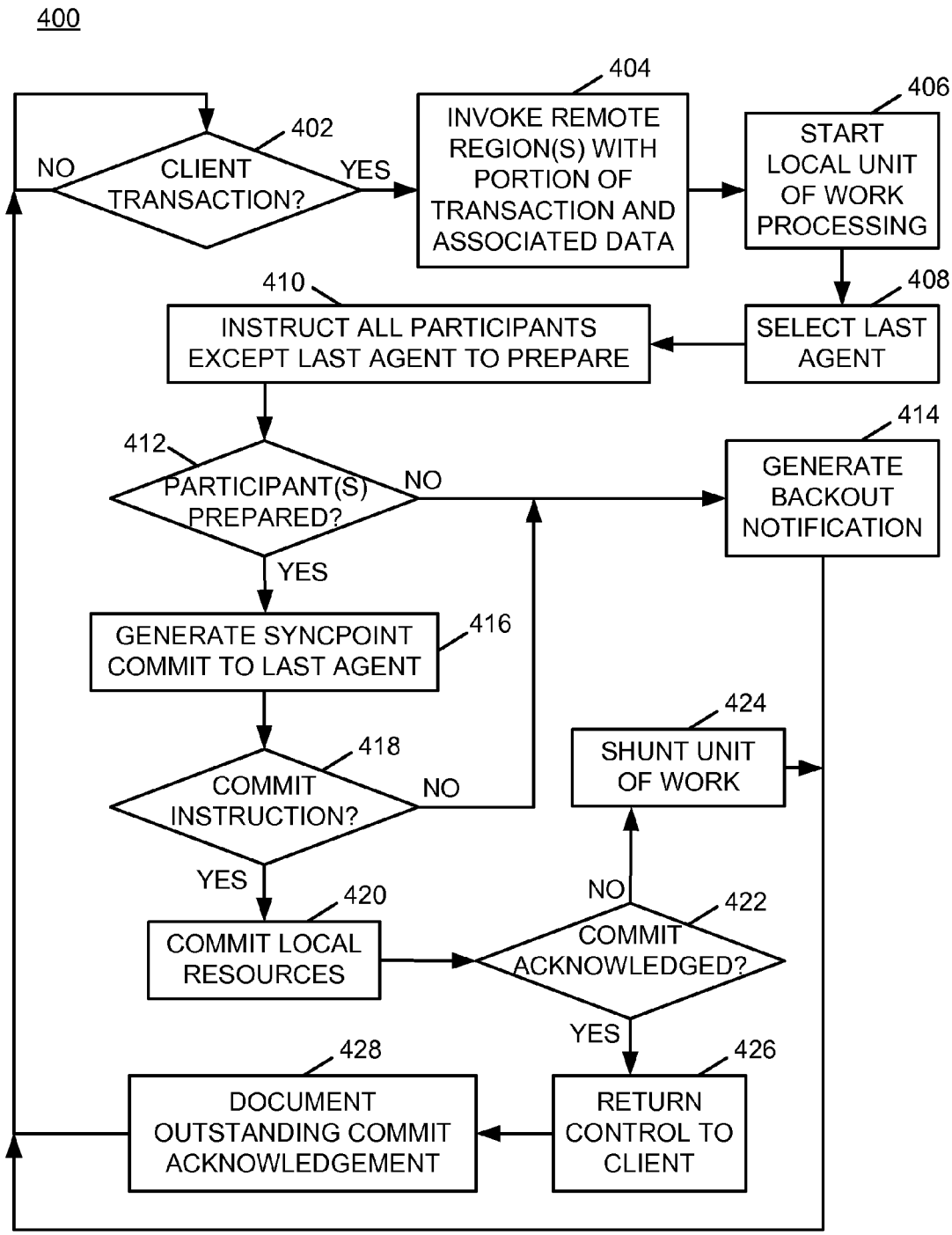
FIG. 4 is a flow chart of an example of an implementation of a process for data readiness using initiator region last commit selection within a front-end region according to an embodiment of the present subject matter.
Figure 5:
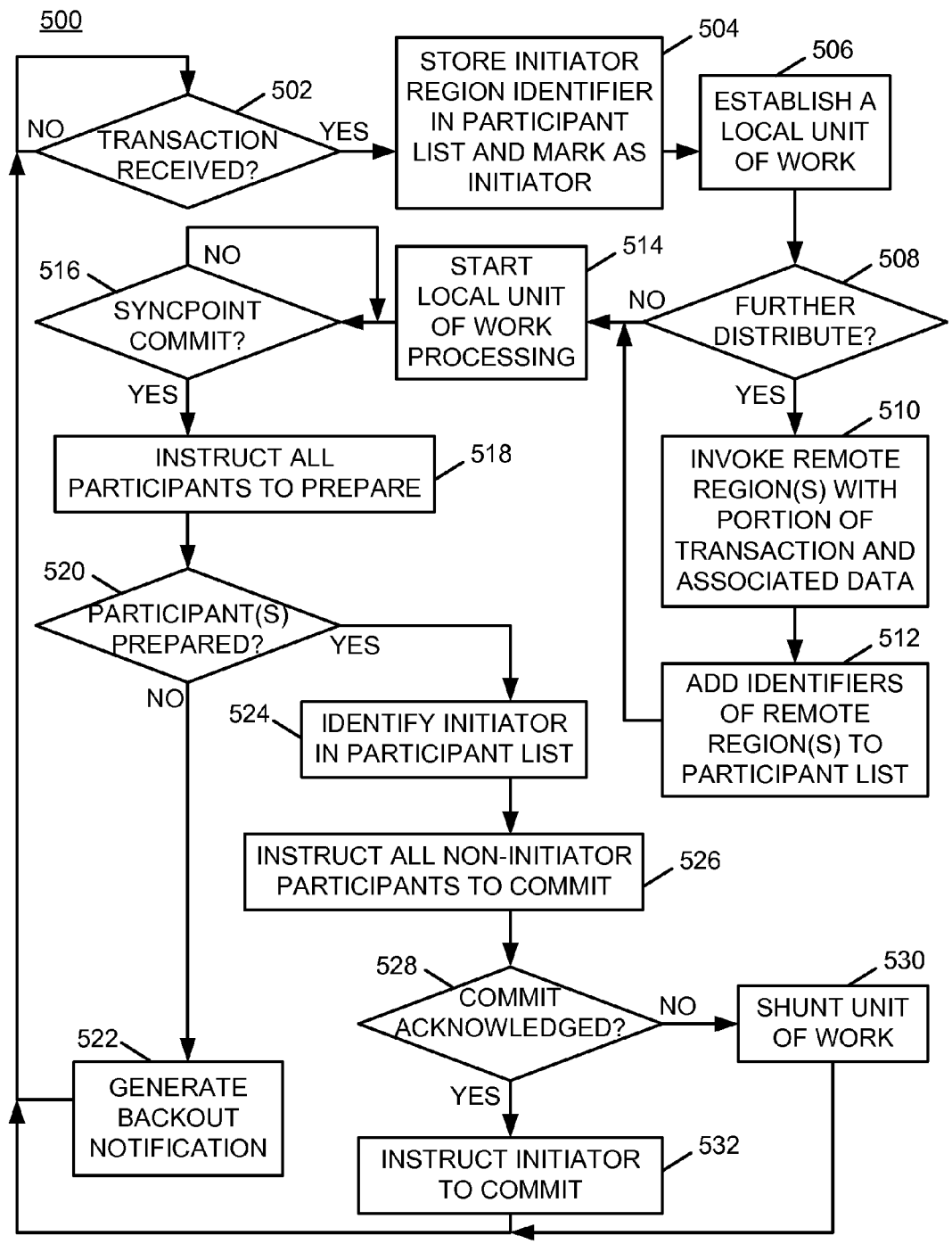
FIG. 5 is a flow chart of an example of an implementation of a process for data readiness using initiator region last commit selection within a back-end region according to an embodiment of the present subject matter.

FIG. 3 through FIG. 5 described below represent example processes that may be executed by devices, such as the core processing module 200, to perform the data readiness using initiator region last commit selection associated with the present subject matter. Many other variations on the example processes are possible and all are considered within the scope of the present subject matter. The example processes may be performed by modules, such as the transaction processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for data readiness using initiator region last commit selection. At block 302, the process 300 receives, at a distributed transaction system operating under a multi-tier two-phase commit protocol, a portion of a transaction from an initiator region. At block 304, the process 300 establishes a local unit of work that represents the portion of the transaction received from the initiator region. At block 306, the process 300 invokes processing of the local unit of work with at least one transaction participant. At block 308, the process 300 receives an indication from the initiator region to assume a role of transaction coordinator for the transaction. At block 310, the process 300 instructs the initiator region to commit last relative to the at least one transaction participant of the local unit of work.

FIG. 4 is a flow chart of an example of an implementation of a process 400 for data readiness using initiator region last commit selection within a front-end region. At decision point 402, the process 400 makes a determination as to whether a client transaction request has been detected from a client application executing within a region supported by the process 400. In response to determining that a client transaction request has been detected from a client application executing within a region supported by the process 400, the process 400 invokes any remote region(s) with a portion of the transaction and any associated data at block 404, such as one or more back-end regions that may include a database management system. At block 406, the process 400 starts local unit of work (UOW) processing.

At block 408, the process 400 selects a last agent from the invoked remote region(s). At block 410, the process 400 instructs all participants (e.g., remote regions and local UOWs) except for the selected last agent region to prepare their respective portions of the transaction (e.g., phase one prepare). At decision point 412, the process 400 makes a determination as to whether all instructed participants have responded with a prepare acknowledgment. For purposes of the present example, it is assumed that sufficient time has expired for propagation of the respective messages.

In response to determining that at least one participant has responded with a negative acknowledgement rather than a prepare acknowledgement, or that a response has not been received from at least one participant, the process 400 generates a backout notification to all participants of the transaction and to the client application that requested the transaction at block 414. The process 400 returns to decision point 402 and iterates as described above.

Returning to the description of decision point 412, in response to determining that all instructed participants responded with a prepare acknowledgement, the process 400 generates a syncpoint commit instruction to the selected last agent region at block 416. As described above, the syncpoint commit instruction passes the coordination role to the selected last agent region and the current front-end region is now "indoubt" with respect to the transaction. FIG. 5 described in detail below illustrates processing for the receipt of a syncpoint commit instruction within a back-end region.

At decision point 418, the process 400 makes a determination as to whether a commit instruction has been received from the selected last agent region. As described above, using the technology described herein, and as described in more detail in association with FIG. 5 below, the front-end region within which the process 400 is executing is considered an "initiator" region from the perspective of the respective back-end region(s) to which a portion of the distributed transaction was invoked at block 404. Using the present technology, the respective back-end region(s) will select the initiator region within which the process 400 is executing as a "last region" to instruct to commit to improve data readiness within the front-end region within which the process 400 is executing. As such, when the commit instruction is received, all other regions that form a portion of the distributed unit of work implemented by the respective back-end region(s) have already been instructed to commit. Further, for any "call and return" type invocations, the return from the respective resource would have also completed. As also described above, the commit instruction received may be a commit instruction operating under the implicit forget protocol. Again, for purposes of the present example, it is assumed that sufficient time has expired for propagation of the respective messages.

In response to determining at decision point 418 that a commit instruction has been not received from the selected last agent region, the process 400 returns to block 414 to generate the backout notification and iterates as described above. In response to determining at decision point 418 that the commit instruction has been received from the selected last agent region, the process 400 issues a commit instruction to local resources associated with the local UOW at block 420.

At decision point 422, the process 400 makes a determination as to whether a commit acknowledgment has been received from all local resources. Once again, for purposes of the present example, it is assumed that sufficient time has expired for propagation of the respective messages.

In response to determining that a commit acknowledgment has not been received from all local resources at decision point 422, the process 400 shunts the unit of work at block 424 and returns to decision point 402 and iterates as described above. Shunting a transaction (unit of work) may include putting the unit of work to the side for a while to resolve the commit problem and until a time when it may complete the commit. The additional processing to later commit a shunted unit of work is outside of the scope of the present description and is omitted for brevity. In response to determining that the commit acknowledgment has been received from all local resources at decision point 422, the process 400 returns control to the requesting client application at block 426. At block 428, the process 400 documents the outstanding commit acknowledgement to the last agent regions. As described above, under the implicit forget protocol, the selected last agent region does not expect an immediate commit confirmation and the confirmation may be piggy backed on another message at a later time. This additional processing to send the piggy-backed acknowledgement is not illustrated within the process 400 for ease of description purposes, though it is understood that such a piggy-backed acknowledgement may be implemented in any manner appropriate for a given implementation. The process 400 returns to decision point 402 and iterates as described above.

As such, the process 400 illustrates one example of front-end processing for implementation of the data readiness using initiator region last commit selection described herein. The process 400 may invoke distributed portions of a transaction requested by a client application. The process 400 may reduce bandwidth by selecting a last agent region and issuing a direct commit instruction to the last agent region rather than issuing both prepare and commit instructions to that region. The "initiator" region may also be selected by the last agent for a last commit resource to improve data readiness within the front-end region within which the process 400 executes.

FIG. 5 is a flow chart of an example of an implementation of a process 500 for data readiness using initiator region last commit selection within a back-end region. The process 500 implements selection of an initiator region from which a portion of a distributed transaction is received as a last commit region to improve data readiness within the initiator region. Further, for purposes of the present example, it is assumed that a process, such as the process 400 described in association with FIG. 4 above, operates within the initiator region using a last agent protocol to select the back-end region within which the process 500 is executing as a last agent region and that, as the last agent region, a syncpoint commit instruction is received instead of both a prepare instruction and a commit instruction. Additionally, it is assumed that the process 500 implements an implicit forget protocol with respect to the initiator region.

At decision point 502, the process 500 makes a determination as to whether a distributed transaction has been received from an initiator region, which is a front-end region relative to the region within which the process 500 is executing. As described above in association with FIG. 4, an initiator region operating as a front-end region may receive a client transaction request and may process a portion of the transaction locally under a local unit of work, and may delegate/distribute a portion of the transaction to a back-end region/device that executes the process 500 to perform the distributed portion of the client transaction. As such, the received distributed transaction may represent a portion of a transaction within the initiator region, as described above. In response to determining that a distributed transaction has been received from an initiator region, the process 500 stores an initiator region identifier within a participant list and marks the identifier as the initiator of the received distributed transaction at block 504. At block 506, the process 500 establishes a local unit of work to support the distributed transaction. The local unit of work may include use of one or more remote distributed resources to perform a portion of the local unit of work, and additional distributed portions of processing may be invoked with any identified remote distributed resources, as described in more detail below.

At decision point 508, the process 500 makes a determination as to whether to further distribute at least a portion of the established unit of work. In response to determining to further distribute at least a portion of the established unit of work, the process 500 invokes one or more remote regions with a portion of the transaction and the associated data at block 510. It should be noted that these remote systems may include databases or other systems. Additionally, as described above, certain systems may be implemented using a "call and return" protocol. From the perspective of the process 500, the invoked remote regions may be considered back-end regions and the region within which the process 500 executes may be considered a front-end region with respect to the remote regions. As such, the process 500 may also implement a process, such as the process 400, to select the remote region(s) as last agents and perform the processing described above in association with FIG. 4 for each such remote region. Accordingly, the processing described herein may be daisy chained across multiple regions.

At block 512, the process 500 adds identifiers of the remote regions to the participant list. In response to adding the identifiers of the remote regions to the participant list at block 512, or in response to determining not to further distribute at least a portion of the established unit of work at decision point 508, the process 500 starts local unit of work processing at block 514. As described above, this processing may include interaction with one or more systems, such as database management systems, that operate under a "call and return" protocol.

At decision point 516, the process 500 waits for and makes a determination as to whether a syncpoint commit instruction has been received from the initiator region. As described above, a syncpoint commit instruction may be implemented as part of a last agent protocol. The syncpoint commit instruction transfers the coordinator role from the front-end initiator region to the back-end region within which the process 500 operating, and the initiator region will be "indoubt" in response to issuing the syncpoint commit instruction and selecting the back-end region as a last agent.

In response to determining at decision point 516 that a syncpoint commit instruction has been received from the initiator region, the process 500 instructs all participants, but not the initiator region, to prepare (phase one of the two-phase commit) at block 518. At decision point 520, the process 500 makes a determination as to whether all participants are prepared. For purposes of the present example, it is assumed that sufficient time has expired for propagation of the respective messages.

In response to determining that at least one participant has responded with a negative acknowledgement rather than a prepare acknowledgement, or that a response has not been received from at least one participant, the process 500 generates a backout notification to all participants of the transaction and to the client application that requested the transaction at block 522. The process 500 returns to decision point 502 and iterates as described above.

Returning to the description of decision point 520, in response to determining that all instructed participants responded with a prepare acknowledgement, the process 500 identifies the initiator region within the participant list at block 524. At block 526, the process 500 instructs all non-initiator participants, including any local resources, to commit.

At decision point 528, the process 500 makes a determination as to whether a commit acknowledgment has been received from all non-initiator participants. For example, the process 500 may poll any "call and return" protocol systems to ensure they are committed prior to invoking the initiator to commit to improve data readiness. Once again, for purposes of the present example, it is assumed that sufficient time has expired for propagation of the respective messages.

In response to determining that a commit acknowledgment has not been received from all non-initiator participants at decision point 528, the process 500 shunts the unit of work at block 530 and returns to decision point 502 and iterates as described above. As also described above, shunting a transaction (unit of work) may include putting the unit of work to the side for a while to resolve the commit problem and until a time when it may complete the commit. The additional processing to later commit a shunted unit of work is outside of the scope of the present description and is omitted for brevity. In response to determining that the commit acknowledgment has been received from all non-initiator participants at decision point 528, the process 500 instructs the initiator region to commit at block 532. The initiator region will no longer be "indoubt" with respect to the delegated coordinator role, and may itself commit its portion of the distributed transaction. As described above, the process 500 may implement an implicit forget algorithm. As such, additional processing for a later-received piggy-backed commit acknowledgment is not illustrated for ease of illustration purposes. However, it should be understood that such processing may be implemented in any manner appropriate for a given implementation. The process 500 returns to decision point 502 and iterates as described above.

As such, the process 500 generates a participant list for a received distributed transaction and identifies the initiator region. In response to receiving a syncpoint commit instruction, by which the region in which the process 500 operates is delegated the transaction coordinator role, the process 500 instructs all participants to prepare under phase one of a two-phase commit protocol. Under phase two of the two-phase commit protocol, the process 500 defers instructing the initiator region to commit until all other participants have been instructed to commit. While the process 500 is illustrated to process commit acknowledgements from all non-initiator participants prior to instructing the initiator region to commit, alternative processing may be performed to instruct the initiator last without waiting for the other regions to respond, as appropriate for a given implementation. Under either possible implementation, when the initiator region is instructed to commit and control is returned back to the initiator region, data committed by the process 500 will be completed for all "call and return" type participants to allow data readiness for a client application within a front-end region implemented by the initiator. As such, the client application may request the data in response to the initiator region returning control to the client application. Accordingly, the process 500 may improve data readiness for distributed transaction processing by using initiator region last commit selection, as described above.

It should be noted that FIG. 4 and FIG. 5 may be combined into the same process for a daisy-chained implementation where any region in the chain is capable of interfacing with a client device/application and operating as an initiator region of a syncpoint. As such, a region within which a process operates may function as a front-end region for connected clients, and as a syncpoint within a back-end region for remote clients associated with other regions.

Accordingly, by architecting the order in which participant units of work are called to commit to ensure the initiator unit of work is called back last, data errors that result from the fact that syncpoints are atomic but not synchronous may be avoided. The present technology recognizes the unique nature of the initiator of a syncpoint in a distributed transaction even where the initiator gives away the coordinator role. For example, the initiator, as a thread of application control is likely to (indeed, almost certainly bound to) continue when the original initiator is informed of the outcome. Under such circumstances, the present technology improves data readiness for client applications under conditions of distributed transactions.

As described above in association with FIG. 1 through FIG. 5, the example systems and processes provide data readiness using initiator region last commit selection. Many other variations and additional activities associated with data readiness using initiator region last commit selection are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a memory;
   a communication module; and
   a processor configured to operate within a distributed transaction system operating under a multi-tier two-phase commit protocol and programmed to:
      receive, via the communication module, a portion of a transaction from an initiator region;
      establish a local unit of work that represents the portion of the transaction received from the initiator region, the processor being programmed to:
         store an initiator region identifier of the initiator region within a participant list of the local unit of work within the memory; and
         mark the initiator region identifier within the participant list as an initiator of the portion of the transaction;
      invoke processing of the local unit of work with at least one transaction participant, the processor being programmed to:
         add an identifier of each of the at least one transaction participant to the participant list;
      receive an indication from the initiator region to assume a role of transaction coordinator for the transaction; and
      instruct the initiator region to commit last relative to the at least one transaction participant of the local unit of work.

2. The system of claim 1, where in being programmed to receive the indication from the initiator region to assume the role of transaction coordinator for the transaction the processor is programmed to receive a syncpoint commit instruction from the initiator region as part of a last agent protocol implemented by the initiator region, where the initiator region is indoubt with respect to the transaction until the initiator region is instructed to commit last relative to the at least one transaction participant of the local unit of work.

3. The system of claim 1, where in being programmed to instruct the initiator region to commit last relative to the at least one transaction participant of the local unit of work, the processor is programmed to utilize an implicit forget commit response acknowledgment protocol, and the processor is further programmed to:
   receive a piggy-backed commit acknowledgement from the initiator region as part of a message associated with a different transaction.

4. A system, comprising:
   a communication module; and
   a processor configured to operate within a distributed transaction system operating under a multi-tier two-phase commit protocol and programmed to:
      receive, via the communication module, a portion of a transaction from an initiator region;
      establish a local unit of work that represents the portion of the transaction received from the initiator region;
      invoke processing of the local unit of work with at least one transaction participant;
      receive an indication from the initiator region to assume a role of transaction coordinator for the transaction;
      instruct the at least one transaction participant to prepare to commit under the multi-tier two-phase commit protocol;
      identify the initiator region as an initiator of the portion of the transaction within a participant list of the local unit of work;
      instruct each of the at least one transaction participant other than the identified initiator within the participant list to commit under the multi-tier two-phase commit protocol; and
      instruct the initiator region to commit last relative to the at least one transaction participant of the local unit of work, the processor being programmed to instruct the initiator region to commit in response to receiving a commit acknowledgement from each of the at least one transaction participant other than the identified initiator.

5. The system of claim 4, where in being programmed to receive the indication from the initiator region to assume the role of transaction coordinator for the transaction the processor is programmed to receive a syncpoint commit instruction from the initiator region as part of a last agent protocol implemented by the initiator region, where the initiator region is indoubt with respect to the transaction until the initiator region is instructed to commit last relative to the at least one transaction participant of the local unit of work.

6. The system of claim 4, where in being programmed to instruct the initiator region to commit last relative to the at least one transaction participant of the local unit of work, the processor is further programmed to utilize an implicit forget commit response acknowledgment protocol, and the processor is further programmed to:
   receive a piggy-backed commit acknowledgement from the initiator region as part of a message associated with a different transaction.

7. A system, comprising:
   a communication module; and
   a processor configured to operate within a distributed transaction system operating under a multi-tier two-phase commit protocol and programmed to:
      receive, via the communication module, a portion of a transaction from an initiator region;
      establish a local unit of work that represents the portion of the transaction received from the initiator region;
      invoke processing of the local unit of work with at least one transaction participant, the processor being programmed to:
         invoke processing of at least one portion of the local unit of work with a remote system that operates using a call and return model;
      receive an indication from the initiator region to assume a role of transaction coordinator for the transaction; and
      instruct the initiator region to commit last relative to the at least one transaction participant of the local unit of work, the processor being programmed to:
         instruct the remote system to commit the at least one portion of the local unit of work;
         receive a commitment acknowledgement of the at least one portion of the local unit of work under the call and return model from the remote system; and
         instruct the initiator region to commit in response to a polled return confirmation of commitment from the remote system under the call and return model.

8. The system of claim 7, where in being programmed to receive the indication from the initiator region to assume the role of transaction coordinator for the transaction the processor is programmed to receive a syncpoint commit instruction from the initiator region as part of a last agent protocol implemented by the initiator region, where the initiator region is indoubt with respect to the transaction until the initiator region is instructed to commit last relative to the at least one transaction participant of the local unit of work.

9. The system of claim 7, where in being programmed to instruct the initiator region to commit last relative to the at least one transaction participant of the local unit of work, the processor is further programmed to utilize an implicit forget commit response acknowledgment protocol, and the processor is further programmed to:
receive a piggy-backed commit acknowledgement from the initiator region as part of a message associated with a different transaction.

10. A computer program product, comprising:
a computer readable storage medium having computer readable program code embodied therewith, where the computer readable program code when executed on a computer causes the computer to:
receive, at a distributed transaction system operating under a multi-tier two-phase commit protocol, a portion of a transaction from an initiator region;
establish a local unit of work that represents the portion of the transaction received from the initiator region, the computer readable program code when executed on the computer causing the computer to:
store an initiator region identifier of the initiator region within a participant list of the local unit of work; and
mark the initiator region identifier within the participant list as an initiator of the portion of the transaction;
invoke processing of the local unit of work with at least one transaction participant, the computer readable program code when executed on the computer causing the computer to:
add an identifier of each of the at least one transaction participant to the participant list;
receive an indication from the initiator region to assume a role of transaction coordinator for the transaction; and
instruct the initiator region to commit last relative to the at least one transaction participant of the local unit of work.

11. The computer program product of claim 10, where in causing the computer to receive the indication from the initiator region to assume the role of transaction coordinator for the transaction, the computer readable program code when executed on the computer causes the computer to receive a syncpoint commit instruction from the initiator region as part of a last agent protocol implemented by the initiator region, where the initiator region is indoubt with respect to the transaction until the initiator region is instructed to commit last relative to the at least one transaction participant of the local unit of work.

12. The computer program product of claim 10, where in causing the computer to instruct the initiator region to commit last relative to the at least one transaction participant of the local unit of work, the computer readable program code when executed on the computer causes the computer to utilize an implicit forget commit response acknowledgment protocol, and the computer readable program code when executed on the computer further causes the computer to:
receive a piggy-backed commit acknowledgement from the initiator region as part of a message associated with a different transaction.

13. A computer program product, comprising:
a computer readable storage medium having computer readable program code embodied therewith, where the computer readable program code when executed on a computer causes the computer to:
receive, at a distributed transaction system operating under a multi-tier two-phase commit protocol, a portion of a transaction from an initiator region;
establish a local unit of work that represents the portion of the transaction received from the initiator region;
invoke processing of the local unit of work with at least one transaction participant;
receive an indication from the initiator region to assume a role of transaction coordinator for the transaction;
instruct the at least one transaction participant to prepare to commit under the multi-tier two-phase commit protocol;
identify the initiator region as an initiator of the portion of the transaction within a participant list of the local unit of work;
instruct each of the at least one transaction participant other than the identified initiator within the participant list to commit under the multi-tier two-phase commit protocol; and
instruct the initiator region to commit last relative to the at least one transaction participant of the local unit of work, the computer readable program code when executed on the computer causing the computer to instruct the initiator region to commit in response to receiving a commit acknowledgement from each of the at least one transaction participant other than the identified initiator.

14. The computer program product of claim 13, where in causing the computer to receive the indication from the initiator region to assume the role of transaction coordinator for the transaction, the computer readable program code when executed on the computer causes the computer to receive a syncpoint commit instruction from the initiator region as part of a last agent protocol implemented by the initiator region, where the initiator region is indoubt with respect to the transaction until the initiator region is instructed to commit last relative to the at least one transaction participant of the local unit of work.

15. The computer program product of claim 13, where in causing the computer to instruct the initiator region to commit last relative to the at least one transaction participant of the local unit of work, the computer readable program code when executed on the computer further causes the computer to utilize an implicit forget commit response acknowledgment protocol, and the computer readable program code when executed on the computer further causes the computer to:
receive a piggy-backed commit acknowledgement from the initiator region as part of a message associated with a different transaction.

16. A computer program product, comprising:
a computer readable storage medium having computer readable program code embodied therewith, where the computer readable program code when executed on a computer causes the computer to:
receive, at a distributed transaction system operating under a multi-tier two-phase commit protocol, a portion of a transaction from an initiator region;
establish a local unit of work that represents the portion of the transaction received from the initiator region;
invoke processing of the local unit of work with at least one transaction participant, the computer readable program code when executed on the computer causing the computer to:
invoke processing of at least one portion of the local unit of work with a remote system that operates using a call and return model;

receive an indication from the initiator region to assume a role of transaction coordinator for the transaction; and instruct the initiator region to commit last relative to the at least one transaction participant of the local unit of work, the computer readable program code when executed on the computer causing the computer to:
    instruct the remote system to commit the at least one portion of the local unit of work;
    receive a commitment acknowledgement of the at least one portion of the local unit of work under the call and return model from the remote system; and
    instruct the initiator region to commit in response to a polled return confirmation of commitment from the remote system under the call and return model.

17. The computer program product of claim 16, where in causing the computer to receive the indication from the initiator region to assume the role of transaction coordinator for the transaction, the computer readable program code when executed on the computer causes the computer to receive a syncpoint commit instruction from the initiator region as part of a last agent protocol implemented by the initiator region, where the initiator region is indoubt with respect to the transaction until the initiator region is instructed to commit last relative to the at least one transaction participant of the local unit of work.

18. The computer program product of claim 16, where in causing the computer to instruct the initiator region to commit last relative to the at least one transaction participant of the local unit of work, the computer readable program code when executed on the computer further causes the computer to utilize an implicit forget commit response acknowledgment protocol, and the computer readable program code when executed on the computer further causes the computer to:
    receive a piggy-backed commit acknowledgement from the initiator region as part of a message associated with a different transaction.

\* \* \* \* \*